(12) United States Patent
Kobayashi

(10) Patent No.: US 9,250,789 B2
(45) Date of Patent: Feb. 2, 2016

(54) INFORMATION PROCESSING APPARATUS, INFORMATION PROCESSING APPARATUS CONTROL METHOD AND STORAGE MEDIUM

(75) Inventor: Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 543 days.

(21) Appl. No.: 13/189,239

(22) Filed: Jul. 22, 2011

(65) Prior Publication Data

US 2012/0050192 A1 Mar. 1, 2012

(30) Foreign Application Priority Data

Aug. 24, 2010 (JP) .................................. 2010-187644

(51) Int. Cl.
*G06F 3/041* (2006.01)
*G06F 3/0488* (2013.01)

(52) U.S. Cl.
CPC ..................................... *G06F 3/0488* (2013.01)

(58) Field of Classification Search
CPC ............ G06F 3/0488; G06F 2203/04808; G06F 3/04883; G06F 3/04886; G06F 3/0416; G06F 3/04812; G06F 3/0304; G06F 2203/04104; G06F 3/041; G06F 3/0412; G06F 3/0482; G06F 3/0484; G06F 2203/04806
USPC ...................... 345/173–179; 178/18.01–20.04
See application file for complete search history.

(56) References Cited

U.S. PATENT DOCUMENTS

| | | | |
|---|---|---|---|
| 2008/0244454 A1* | 10/2008 | Shibaike | 715/835 |
| 2009/0193366 A1* | 7/2009 | Davidson | 715/863 |
| 2009/0267903 A1* | 10/2009 | Cady et al. | 345/173 |
| 2010/0053221 A1 | 3/2010 | Kaneko et al. | |
| 2010/0085316 A1* | 4/2010 | Kim | 345/173 |
| 2010/0177931 A1 | 7/2010 | Whytock et al. | |

FOREIGN PATENT DOCUMENTS

| | | |
|---|---|---|
| JP | 2001-290585 A | 10/2001 |
| JP | 2010-040029 A | 2/2010 |
| JP | 2010-086519 A | 4/2010 |

OTHER PUBLICATIONS

Feb. 21, 2014 Japanese Official Action in Japanese Patent Appln. No. 2010-187644.

* cited by examiner

*Primary Examiner* — Abbas Abdulselam
*Assistant Examiner* — Gerald Oliver
(74) *Attorney, Agent, or Firm* — Fitzpatrick, Cella, Harper & Scinto

(57) ABSTRACT

A user interface technique with excellent operability for displaying an object to be selected upright for an operator who operates a display screen of a display device from any direction. For this purpose, when the operator touches the display screen with his/her index finger, menu icons are displayed on a circumference with the touch position as a center, and with the central position of the circle as a lower position, at equal intervals. At this time, when the operator touches the display screen with his/her thumb while touching the display screen with his/her index finger, it is determined that the operator exists on an extension line on the thumb touch position side defined with the two touch positions. Then the respective menu icons are rearranged so as to be displayed upright from the operator.

12 Claims, 8 Drawing Sheets

INFORMATION PROCESSING APPARATUS, INFORMATION PROCESSING APPARATUS CONTROL METHOD AND STORAGE MEDIUM

BACKGROUND OF THE INVENTION

1. Field of the Invention

The present invention relates to a menu display technique accompanying coordinate detection.

2. Description of the Related Art

Conventionally, a drawing tool and the like having a function of arraying objects arranged by a user on contents are known. Generally, when plural objects are arrayed, first, the user drags a mouse to select plural objects, then clicks the right mouse button to open a menu for arrangement. Then, among the menu items, the user selects a desired type of arrangement style.

Further, an interactive display in which an operation is performed by an operator's directly touching its screen is known. This interactive display is realized by integrating a display device and a touch panel as a position detecting device or a coordinate input device. The operator can perform display control by directly touching the display screen, thereby an intuitive operation environment like "use with paper and a pencil" is provided.

Further, as this type of touch panel or coordinate input apparatus, a device capable of detecting plural instructing positions is known.

Japanese Patent Laid-Open No. 2001-290585 discloses a technique for enlarging/reducing/rotating an object based on a change of distance between designated two points or an angular change.

Japanese Patent Laid-Open No. 2010-040029 discloses a structure having recognition means for recognizing designation of plural positions on a display unit, in which plural objects can be selected by a first designating operation. Further, the structure has alignment means for, when a second designating operation is performed in that status and when movement in the first position or the second position has been detected, aligning the plural objects on the display unit in accordance with the locus of the movement.

Further, Japanese Patent Laid-Open No. 2010-086519 discloses the action of an object selection by a first designating operation and a scroll operation by a second designating operation on other objects than the selected object.

Generally when this type of interactive display is used, it is placed upright on a desk or put on the wall. Accordingly, an operational environment can be provided to the operator without a sense of discomfort by bringing the up-and-down direction of a displayed object into correspondence with the vertical direction.

However, when the display screen is placed flat on the desk and plural operators are seated around the display screen (FIG. 7A), an operational environment convenient for one operator is not a comfortable operational environment for the opposite operator (FIG. 7B). That is, for the opposite operator, the display of the object is upside-down, and the display disturbs instantaneous understanding.

SUMMARY OF THE INVENTION

The present invention has been made so as to address the above-described problem. The present invention provides a user interface technique with excellent operability to enable erect display of a selected object for an operator regardless of operational direction with respect to the display screen of the display device.

To attain the above-described problem, the present invention provides: an information processing apparatus which displays a plurality of objects to be selected on a display screen of a display device, and performs processing in accordance with an object selected by an operator, comprising: a detecting unit that determines whether or not the operator has touched the display screen and can detect at least two touch positions; a first display control unit that, when the detecting unit detects a first touch, displays the respective plurality of objects to be selected in a predetermined position with respect to the first touch position in a predetermined direction; and a second display control unit that, when the first display control unit has displayed the plurality of objects to be selected, and the detecting unit detects a second touch while continuously detecting the first touch, determines one predetermined direction of a line connecting the first touch position and the second touch position as a display direction of the respective objects, and rearranges and displays the plurality of objects in the determined direction, wherein, when one of the plurality of objects to be selected, displayed by the first display control unit or the second display control unit, is selected, processing in accordance with the selected object is performed.

According to the present invention, from whatever direction with respect to the display screen of the display device an operation is performed by the operator, an object to be selected is erect displayed to the operator. Thus a user interface technique with excellent operability can be provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinbelow, preferred embodiments of the present invention will be described in detail reference to the attached drawings. Note that the construction shown in the following embodiments is merely an example, but the present invention is not limited to the illustrated construction.

Figure 8:
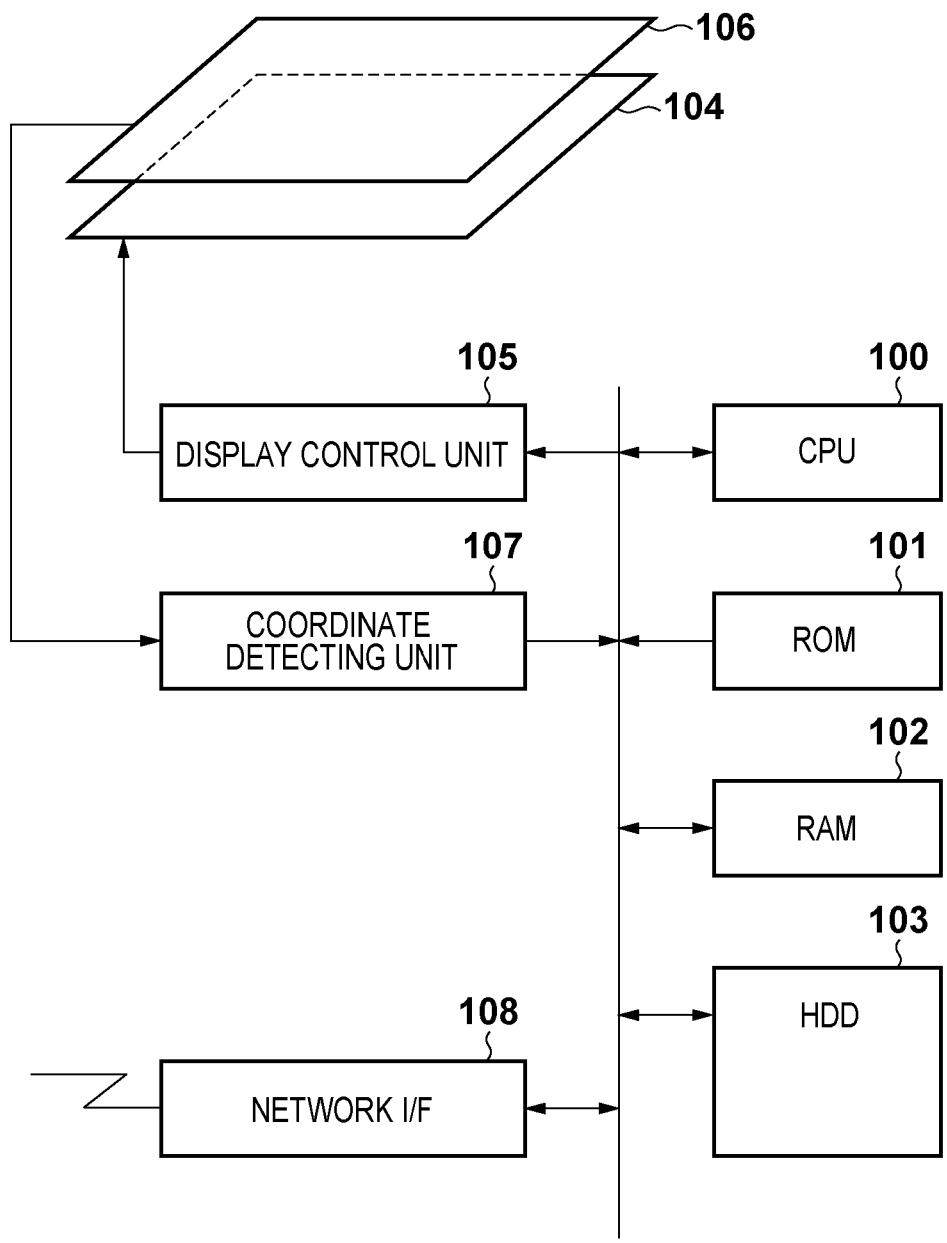
FIG. 8 is a block diagram of an information processing apparatus in the embodiments of the present invention.

FIG. 8 is a block diagram showing an information processing apparatus according to the embodiments. The present apparatus has a CPU 100 to control the entire apparatus. Further, the apparatus has a ROM 101 holding the BIOS and a boot program, and a RAM 102 used for loading of an OS (Operating System) and applications (to be described in detail later) executed by the CPU 100 and used as a work area. Further, the present apparatus has a hard disk drive (HDD) 103 to hold the OS, applications and various data files, a display control unit 105 to perform display control on images to a display 104 or the like such as a liquid crystal, a coordinate detecting unit 107 to detect a touch position to a transparent touch panel 106 provided on a display screen, and a network interface 108.

Figure 7A:
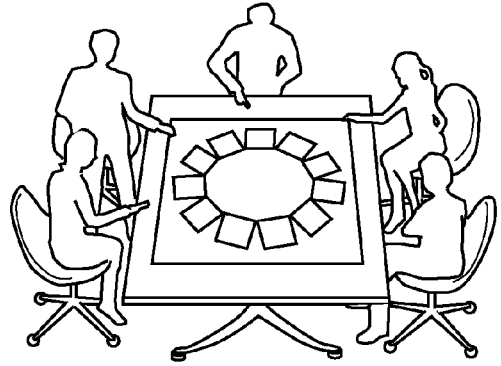
FIGS. 7A and 7B are explanatory views of an operational environment.

Note that as in the case of FIG. 7A, the display 104 is placed flat on a horizontal top surface of a table such that plural operators can be seated around the display. Note that as long as the plural operators can visually observe an image displayed on the horizontal surface, a video image may be projected from a position above a projection table onto the projection table. Accordingly, the present invention is not limited to the above structure. Further, in the embodiments, as long as at least two designation (touch) positions on the display screen by the operator can be detected, any type of coordinate detection method can be employed.

In the above-described structure, when the power of the present apparatus is turned ON, the CPU 100 loads the OS from the HDD 103 to the RAM 102 in accordance with the boot program in the ROM 101. Next, the CPU 100 loads an application program described below from the HDD 103 to the RAM 102 to execute the program, so as to function as an information processing apparatus which allows plural operators to share an operation as described below. For the sake of simplifying the explanation, when each of the plural operators touches the display screen, the apparatus in the embodiments displays drawing-related menu items to allow the operator to select one item and performs processing in accordance with the selected menu item (drawing, editing or the like).

First Embodiment

Figure 7B:
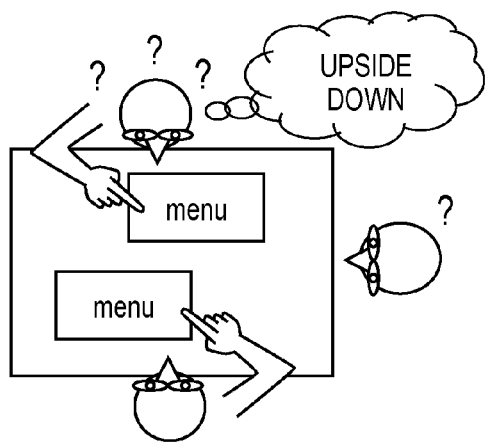

As described in FIGS. 7A and 7B, when the display screen is placed on the desk and plural operators are seated around the display screen, an operational environment comfortable for one operator is not preferable operational environment for the opposite operator, since the display of an object to be selected is upside-down to the person facing the operator and the display disturbs the person's understanding of the object.

Accordingly, in the first embodiment of the present invention made so as to address the above-described problem, even when plural operators surrounding a display screen on the desk respectively operate the display, an operational environment to each of plural operators can be provided.

Figure 4A:
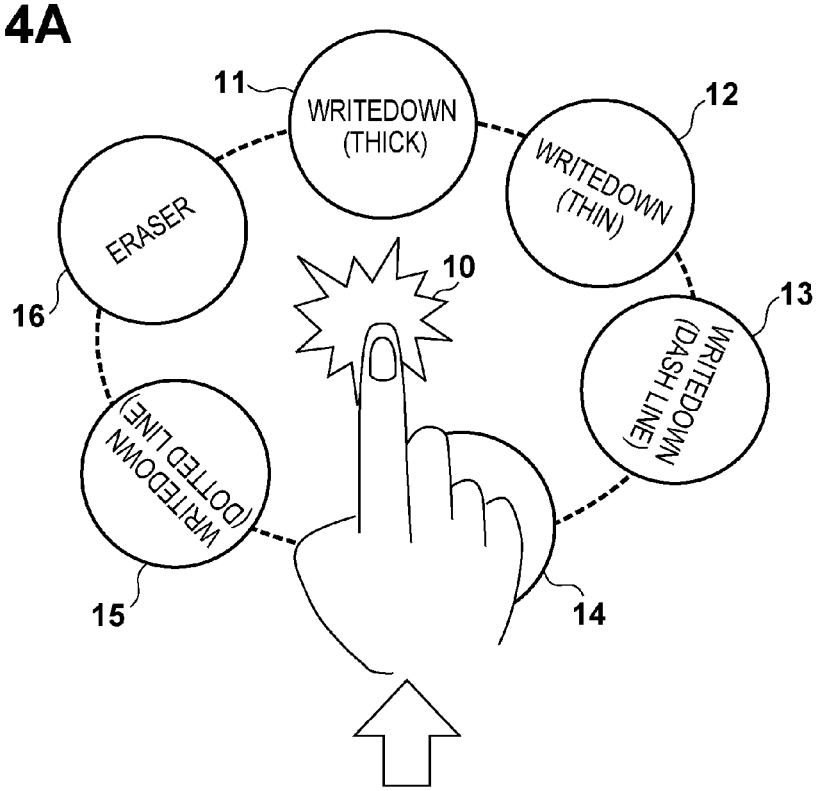
FIGS. 4A and 4B are explanatory views of the initial status of the menu mode.

FIG. 4A shows an example of a menu mode set by a continuous touch of a touch position 10 by an operators first touch operation. Further, FIG. 4A shows an example of a display status by arranging menu icons 11 to 16 evenly on a circumference having a predetermined radius about the first touch position 10. Since it is impossible for the CPU 100 to detect the position of the operator at this time, it is rational to display the menu icons at equal intervals along the circumference. Note that assuming that the end of the operator's line of sight exists in the arrow direction in FIG. 4A, it is possible for the operator to immediately grasp the display contents of at least icons 11, 12 and 16. That is, in this example, it can be considered that in whatever direction the line of sight exists, the operator can recognize about three of the six icons. In other words, the icons 13 to 15 in FIG. 4A are displayed upside-down for the operator, and it is difficult for the operator to instantly understand them.

Figure 4B:
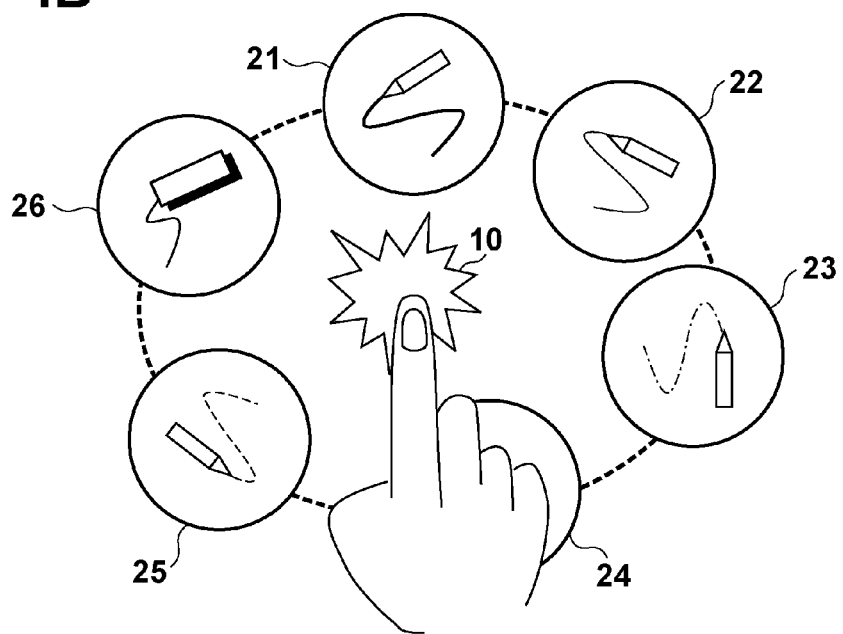

To solve this problem, use of graphical image icons 21 to 26 as shown in FIG. 4B in place of the character icons may facilitate instant understanding upon being displayed upside-down. However, in the case of the graphical image icon display, only brief information is given to the operator in comparison with the character icon display. Accordingly, it is inappropriate as a menu that is displayed for detailed operation.

Further, it is inconvenient to evenly array the icons on the circumference since the recognition of the icon 14 or 24 is blocked by the operator's arm.

Figure 5A:
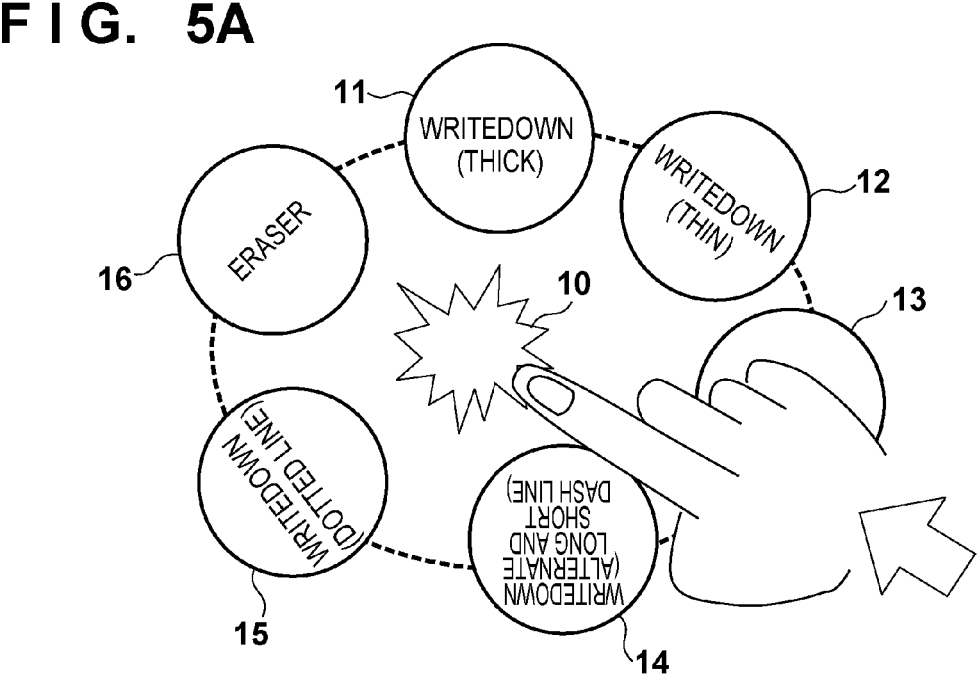
FIGS. 5A and 5B are explanatory views of the first embodiment.

In the first embodiment, as shown in FIG. 5A, first, as a first touch operation, the operator touches a desired position 10 with his/her index finger continuously for a predetermined period (e.g. about 1 to 2 seconds) to continue the designation in the position, and with this operation, the current mode is changed to a menu mode. In the menu mode, a plurality of menu icons are displayed at equal intervals on the circumference with the first touch position as an approximate center. As described above, in this case, assuming that the operator's line of sight exists in the arrow direction in FIG. 5A, the icons 12 and 14 are upside down, and the icon 13 is blocked with the operator's hand or arm and cannot be recognized.

Figure 5B:
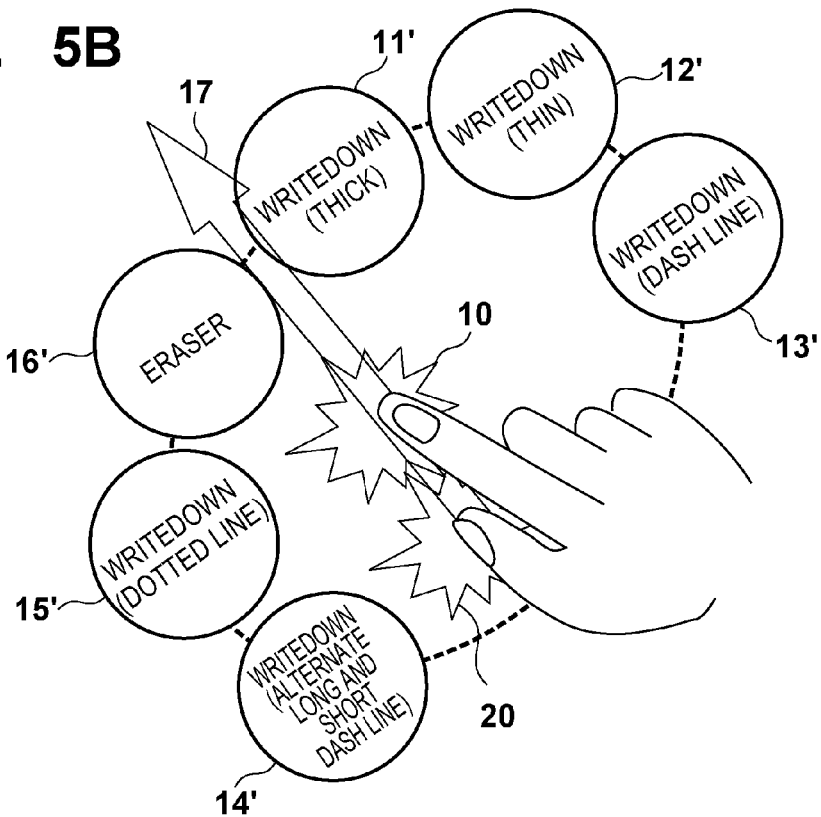

Accordingly, in the present first embodiment, in a status where the above-described first touch position 10 is continued, as shown in FIG. 5B, when a touch on a second touch position 20 by a thumb is detected, it is determined that the operator exists in a direction from the first touch position 10 toward the second touch position 20. Then the menu icon is displayed in an upright position from the determined position of the operator. That is, the respective menu items are displayed, with characters along with an upward direction indicated with an arrow 17 in the figure from the second touch position 20 toward the first touch position 10. With this control, all the menu icons can be displayed in a direction convenient for the operator and legibility can be improved. Further, in the present embodiment, icons 11' to 16' are displayed, at narrower intervals, on the circumference about the first touch position 10 and in a direction away from the second touch position 20.

Note that the display in FIG. 5B is made particularly based on the following processing. The plural menu icons to be selected are arranged, at intervals narrower than the intervals displayed in the first display control processing (FIG. 5A), so as not to overlap each other, on the circumference. Note that the central position of the array of the plural menu icons to be selected is arranged to correspond with one of two intersections between an extension line connecting the first touch position and the second touch position and the above-described circumference far from the second touch position.

When the display in FIG. 5B has been once produced, the operator performs selection by touching one of the menu icons. When the menu icon selection is detected, the menu display is quitted, and the corresponding processing is performed. Further, in a case where a predetermined period has elapsed without any touch, the menu display is also ended, and the previous mode is restored.

To realize the above-described function, it is necessary that the touch of the first touch position 10 and the touch of the second touch position 20 are made by the same person. In the present embodiment, in a case where the touch of the first touch position 10 is detected and the current mode is changed to the menu mode, when a touch in a position within a predetermined distance (about 20 cm is enough) from the first touch position is detected, it is determined that the touch is made by the same person and the above-described processing is performed.

As a result of the above processing, the operator can recognize all the icons without blocking them with his/her hand/arm from whatever direction. Further, as the icons are rearranged in positions suitable to the operator's sight line direction, the arrangement of the icon facilitates the operator's understanding. Further, since the menu icon is displayed by the touch with the operator's index finger and the rearrangement can be intuitively performed by the touch with his/her thumb, stressless and user-friendly excellent operability for every operator is realized.

FIGS. 1A and 1B, FIG. 2 and FIGS. 3A and 3B are flowcharts explaining the series of processes showing a part of processing by an application program executed by the CPU 100. Note that the flag and variable described below are ensured in the RAM 103.

First, at step S101, a signal indicating touch detected/not detected status from the coordinate detecting unit 107 is monitored. When no coordinate is detected, a flag Mode is set to "0" at step S104, then the process returns to step S101. When the signal indicating detection of coordinates is received, the notified coordinate position at this time is stored into the RAM 102, then it is determined whether or not the flag Mode is "0" at step S103. When the flag Mode=0 holds, as the initial coordinate designation has been detected, a timer variable T is cleared to "0" at step S105, and the flag Mode is set to "1", thereafter the process returns to step S101.

As described above, when the operator continues to touch in some position of the display screen, the determination at step S103 becomes "No", and the process proceeds to step S106. At step S106, the coordinate position stored at step S102 and the current coordinate position are compared with each other and when it is determined that the both coordinate positions are the same value, the process proceeds to step S107, otherwise, it is determined that the touch position is changed. Then flag setting is performed at step S109 as a normal operation mode and the flag Mode=3 holds.

Figure 1A:
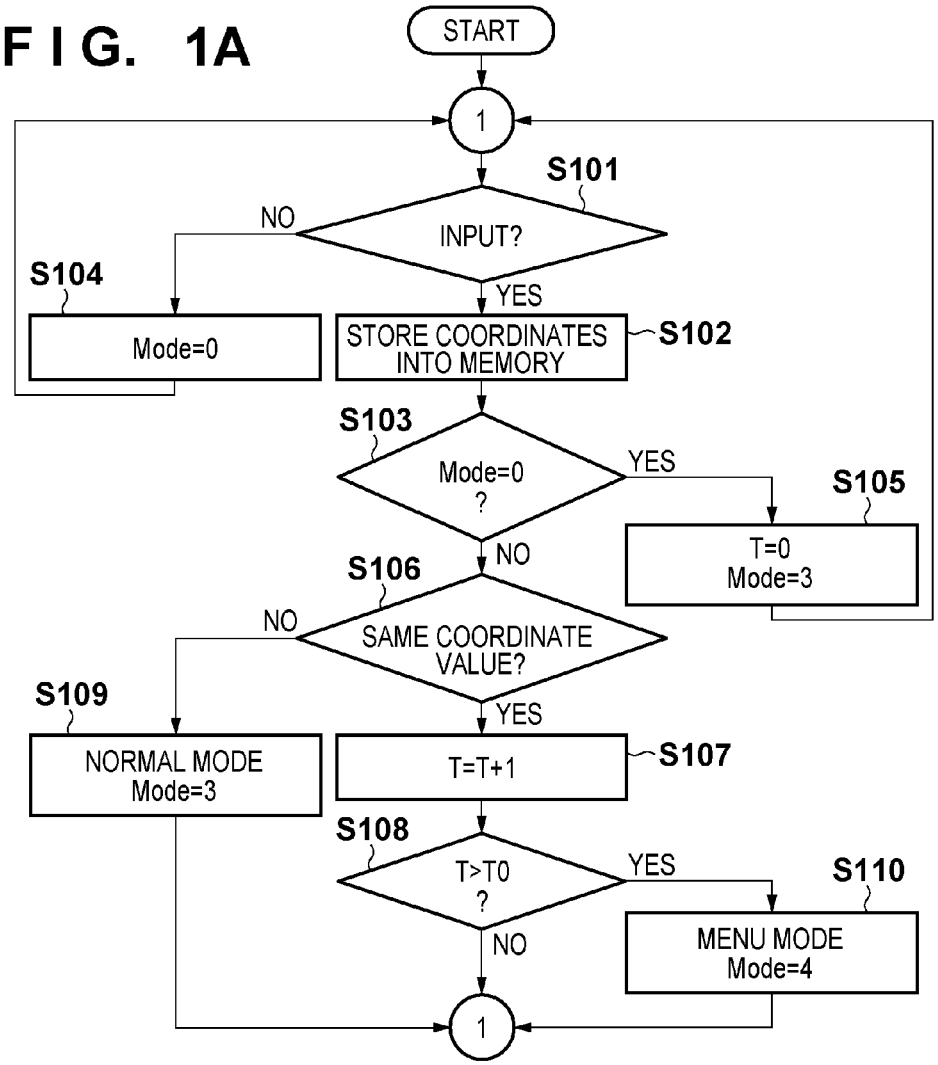
FIGS. 1A and 1B are flowcharts showing transition between a drawing mode and a menu mode in a first embodiment of the present invention.
Figure 1B:
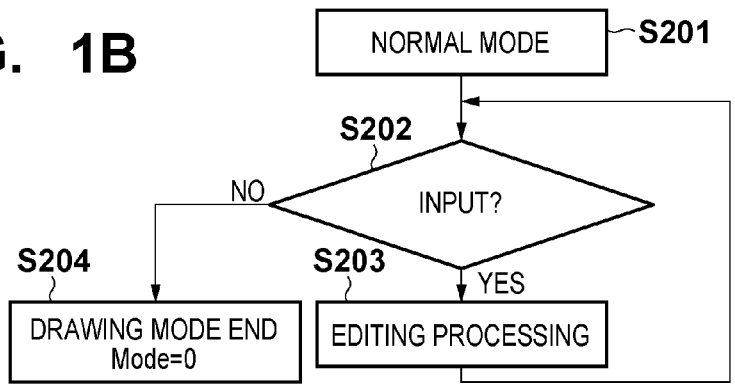

As shown in FIG. 1B, in the normal mode (S201), when the touch operation is continuously performed, the flow at steps S202 and S203 is repeated until the touch operation ends at step S204, and the editing processing is performed by the information processing apparatus based on the detected series of coordinate values. For example, when the currently-used application software is drawing software, in accordance with the series of coordinate values, the locus of the touch operation by the operator is drawn as a pencraft.

On the other hand, at step S106 in FIG. 1A, when coordinate values within approximately the same range as that of the previously detected coordinate value is detected, a counter variable T is incremented at step S107. Then at step S108, it is determined whether or not the counter variable T exceeds a predetermined value T0, i.e., whether or not the touching operation has been continued in the same position for a predetermined period corresponding to a threshold value T0 or longer. When it is determined that the touch operation has been continued in the same position for the predetermined period, the process proceeds to step S110, at which the current mode is changed to the menu mode, and the flag Mode is set to "4".

Figure 2:
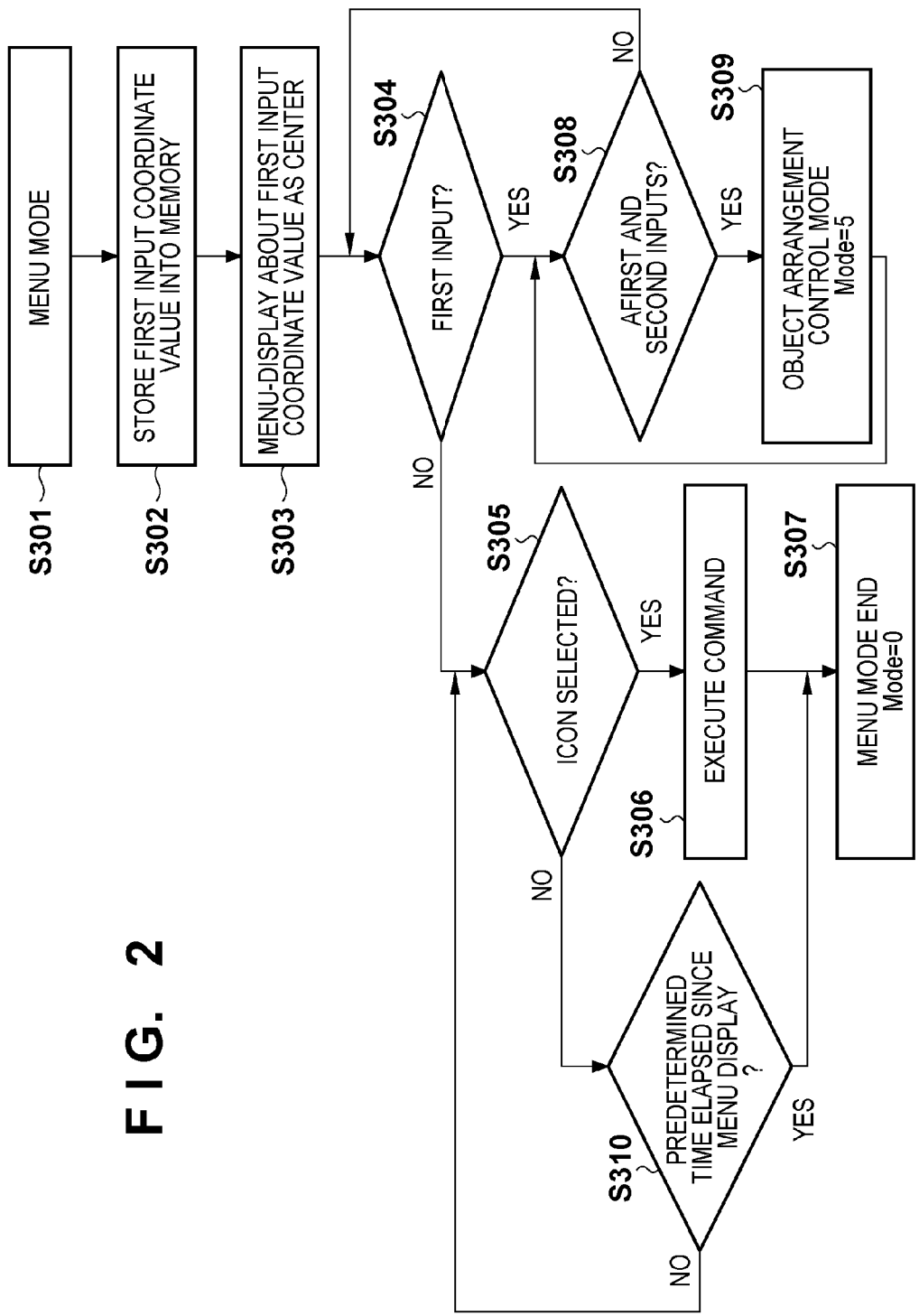
FIG. 2 is a flowchart explaining the menu mode.

Hereinbelow, processing upon mode transition to the menu mode will be described in accordance with the flowchart of FIG. 2.

At step S301, the CPU 100 starts the present processing. At step S302, the coordinate position stored at the previous step S102 is stored as a first touch position. Then at step S303, about the first touch position as an approximate center, plural icons (menu items) necessary as a menu are evenly displayed on the circumference (first display control processing). That is, the touch position and the display on the display screen are as shown in FIGS. 4A and 4B or FIG. 5A. In this status, at step S304, it is determined whether or not the first touch input is continuously performed. Once it is determined that the first touch input has been released (the status has been changed to a non-touch status), the process proceeds to step S305. This status corresponds to FIG. 4A, in which the operator has released his/her finger from the display screen so as to touch the upright-displayed menu icon 11. At step S305, the one of the displayed menu icons which has been touched is determined. Then, when the touched menu icon has been determined, an operation assigned to the icon is performed at step S306, and at step S307, setting is made such that the flag Mode=0 holds and the displayed menu icons are deleted from the display screen, then the menu mode ends. Further, when it is determined at step S305 that no menu icon has been selected, the process proceeds to step S310, at which it is determined whether or not a predetermined period has elapsed from the start of the menu display. When it is determined that the predetermined period has not elapsed, selection of a menu icon is waited. When it is determined that the predetermined period has elapsed, the menu mode ends at step S307.

At step S303, plural menu icons are displayed about the first touch position as a center, then, when it is determined at step S304 that the input in the first touch position has been continued, the process proceeds to step S308. At step S308, it is determined whether or not a second touch input has been performed. As described above, the second touch input is performed within a predetermined distance from the coordinate position recognized as the first touch position, and a touch without the region is not recognized as a second touch input. When three or more coordinate positions are detected, it may be determined that the touch input is the first touch input by another operator. Further, when up to two coordinate positions are detected, the processing cannot be continued due to the touch inputs, accordingly, the present menu mode ends.

Upon detection of the second touch input within the predetermined distance from the first touch input position, following the first touch input, it is regarded that the touch inputs by the same person. Then the process by the CPU 100 proceeds to step S309 as second display control processing, to perform arrangement processing of displayed plural menu icons (the current mode is changed to an object arrangement control mode). Thus the status in FIG. 5A is changed to a status in FIG. 5B (to be described in detail later). Since the operator visually observes the display screen and select a target menu icon, the operator once releases his/her finger from the display screen. Accordingly, as the subsequent processing, the process proceeds to step S308→S304→S305, to select the menu icon.

Figure 3A:
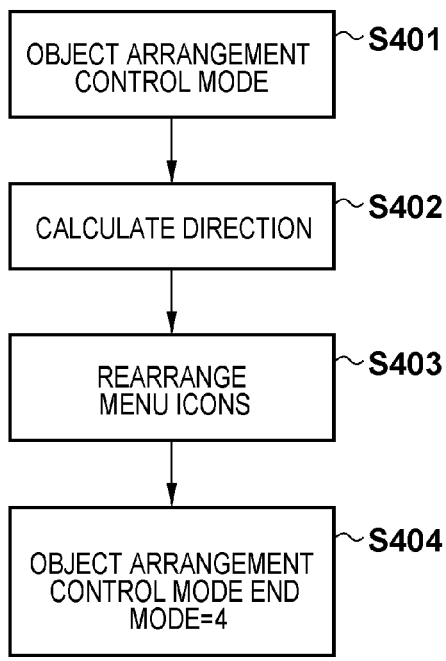
FIGS. 3A and 3B are flowcharts showing an object arrangement mode according to the first and second embodiments of the present invention.

The operation of the object arrangement control mode at step S309 in the first embodiment will be described in accordance with the flowchart of FIG. 3A.

At step S401, the CPU 100 starts the present processing. Then at step S402, based on the first touch position stored at the previous step S302 and the currently detected second touch position, on the assumption that the operator exists in one direction of an extension line connecting the first touch position and the second touch position (an extension line direction from the first touch position toward the second touch position side), the "upper side" of the displayed menu icon is determined as a reversed side (in the direction of an arrow 17 in FIG. 5B). Then at step S403, regarding the first touch position, the menu icons are re-arrayed and displayed on the opposite side to the second touch position. More particularly, on the circumference about the first touch position 10, with one of two intersections with the extension line connecting the first touch position and the second touch position, far from the second touch position, as a display position of a central menu icon among the plural menu icons to be displayed, the respective menu icons are displayed at predetermined equal intervals on both sides from the central position. The interval at this time is narrower than the menu icon display interval before the second touch position detection, to avoid overlap between the respective menu icons. Further, at this time, the CPU 100 displays the respective menu icons such that the arrow 17 direction is "upward" when viewed from the operator. As a result of the above processing, the menu icons are displayed in the status in FIG. 5B. Then, at step S404, the object arrangement control mode ends, and the flag Mode=4 holds, then the process returns to step S308.

As a result of the above control, it is possible to rearrange the menu icons from the status in FIG. 5A to the status in FIG. 5B, and the operator can instantly understand the contents of the objects from any direction. Further, as the display is realized by the operator's intuitive operation, any special training is not required, and a user-friendly excellent operational environment can be provided. Further, it is possible to provide a preferable information processing apparatus, with a table top plate as a display screen, for plural operators surrounding the display screen.

Second Embodiment

Hereinbelow, a second embodiment of the present invention will be described in accordance with FIGS. 6A to 6C.

Figure 6A:
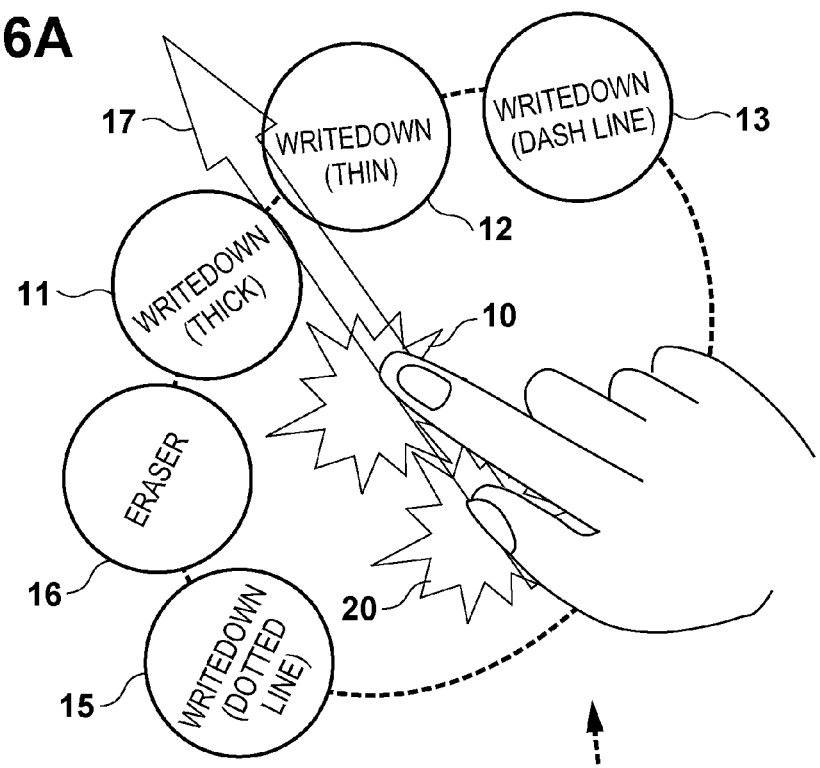
FIGS. 6A to 6C are explanatory views of the second embodiment.

FIG. 6A shows the status in FIG. 5B described in the first embodiment, in which the touch operations in the first touch position 10 and the second touch position 20 are continuously performed. In this status, assuming that an arm is moved in parallel between the first and second touch positions, it may be arranged such that the icon display status shown in FIG. 6A is update-displayed by real-time rearrangement in accordance with the moving operation.

Figure 6B:
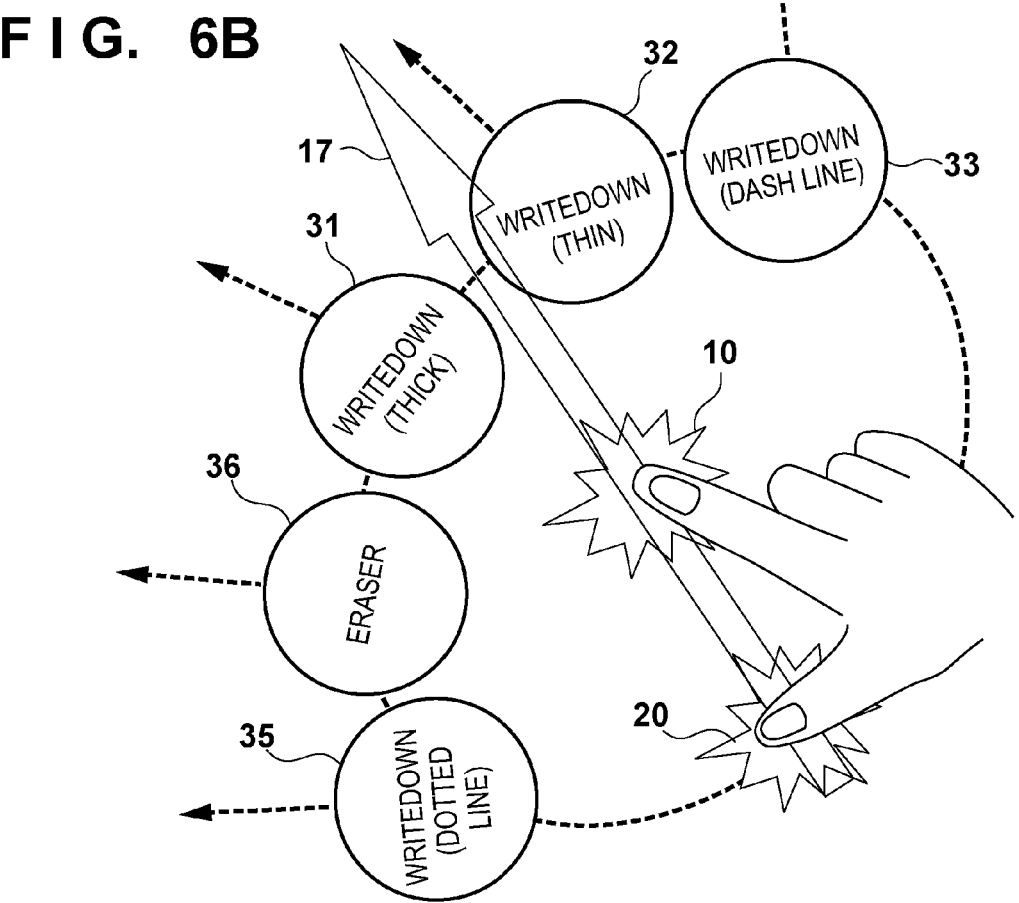

Further, as shown in FIG. 6B, when the operator's thumb is moved along the arrow direction 17, i.e., the distance between the first touch position and the second touch position is changed, it may be arranged such that the display is update-displayed by real-time change of the size of the menu icons 31 to 36 in accordance with the first and second touch positions after the movement while the attitudes of the menu icons are held (the icon size is changed in proportion to the distance between the first touch position and the second touch position). Further, to avoid overlap of menu icons accompanying the operation, the radius of the circumference on which the icons are arranged may be changed.

Figure 6C:
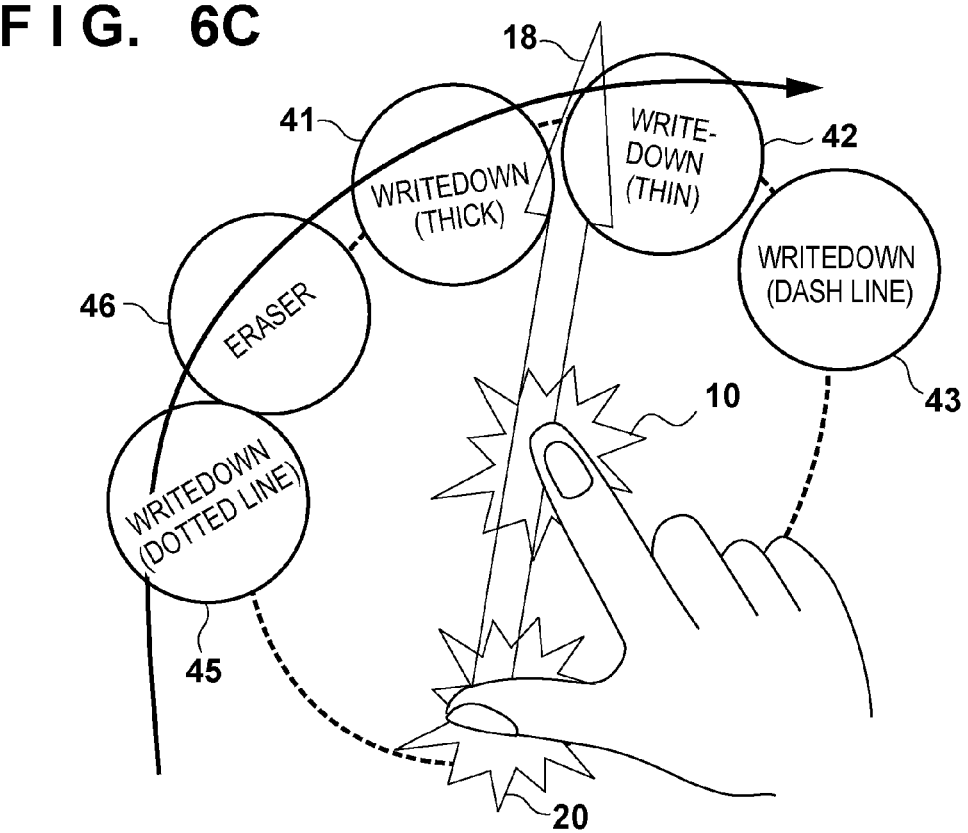

Further, as shown in FIG. 6C, the direction defined with the first touch position and the second touch position is changed from the arrow 17 to the arrow 18 by moving the second touch position (thumb). With such operation, the displayed icons 41 to 46 may be rotated in the circumferential direction or the attitudes of the icons may be changed so as to perform attitude control.

With this arrangement, an excellent operational environment more preferable for the operator can be obtained.

Figure 3B:
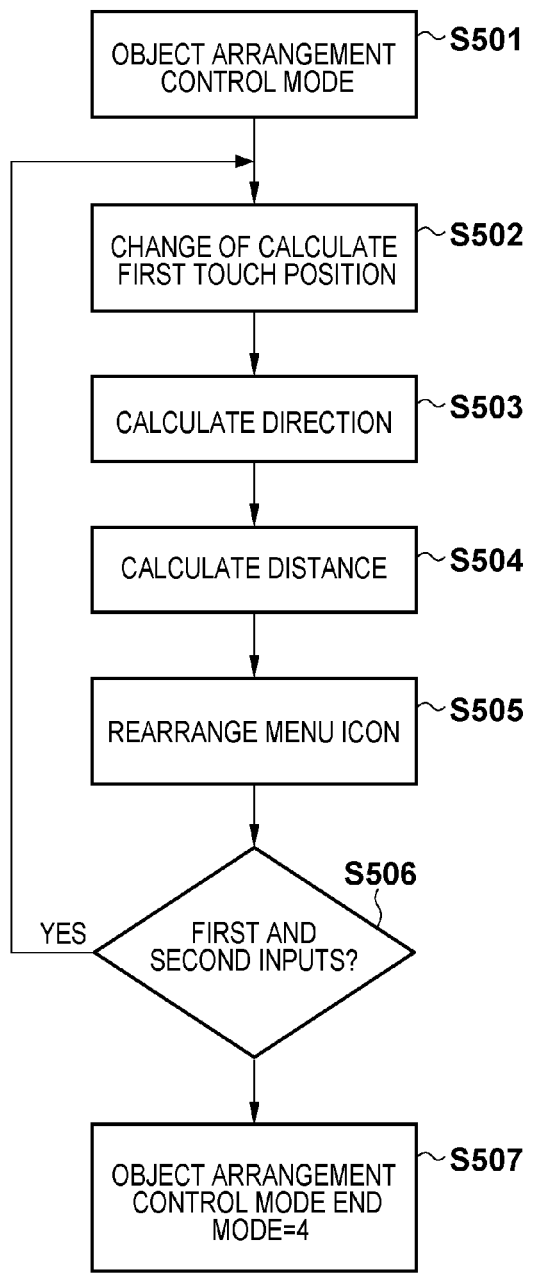

FIG. 3B shows the processing of the object arrangement control mode (S309 in FIG. 2) in the second embodiment. Since the other processes are the same as those in the first embodiment, the explanations of the processes will be omitted.

First, at step S501, the CPU 100 starts the object arrangement control mode in the second embodiment. Then at step S502, the difference between the first touch position stored at the previously described step S302 and the currently-detected first touch position is calculated. At step S503, based on the second touch position, the direction defined with the currently-detected first touch position and the currently-detected second touch position is calculated and stored. At step S504, the distance between the both positions are calculated. At step S505, based on the moving amount of the first touch position calculated at step S502, the menu icons are moved in parallel, in the status in FIG. 6A, and again re-displayed. Further, at step S505, based on the direction calculated at step S503, the attitudes of the menu icons are controlled as shown in FIG. 6C and again re-displayed. Further, at step S505, based on the distance information calculated at step S504, the size of the menu icons as shown in FIG. 6B is controlled and again re-displayed. At step S506, it is determined whether or not the first input and the second input are continued. When it is determined that the first input and the second input are continued, the process returns to step S502. Then, based on the changes of the first and second touch positions, calculations are performed at steps S502, S503 and S504, and at step S505, the menu icons are rearranged. Further, when it is determined at step S506 that the first and second touches have been released, it is determined that the operator has been released the touch so as to select a target one of the displayed and arranged menu icons at that time. Then the object arrangement control mode is ended, and setting is made such that the flag Mode=4 holds at step S507.

With the above-described operation, the menu icon rearrangement and re-display as shown in FIGS. 6A to 6C can be performed.

Note that in the above-described embodiment, when the menu icon rearrangement and re-display have been completed and a display appropriate for the operator is produced, the operator once releases his/her finger from the display screen so as to select a target menu icon. However, the present invention is not limited to this arrangement. For example, in FIG. 2, when the operator sets a preferred menu display format through the operations at steps S304, S308, S309 and S308, the process returns to step S304. At this time, when the second input is interrupted and only the first input is continuously performed, steps S304 and S308 are looped. Then, when the first input is interrupted, based on the finally-outputted first input positional information, it is determined whether or not an icon has been selected at step S305. When it is determined that an icon has been selected, the assigned command is executed. When any icon has not been selected, the assigned command is executed. When any icon has not been selected, the process proceeds to step S307, at which an operation to end the menu mode may be performed.

Third Embodiment

In the above description, when the first touch is continued in the same position, the menu icons are displayed on the circumference about the touch position as an approximate center (the current mode is changed to the menu display mode), however, the present invention is not limited to this arrangement. That is, the menu icons may be displayed, not necessarily on the circumference, but in a peripheral region including the first touch position.

Further, the present invention is not limited to the use case of the menu display described in the above embodiments, but the present invention is applicable to any case as long as plural objects can be selected based on the first touch.

More particularly, for example, when a closed loop is drawn based on a first touch, objects arranged within the closed loop are selected. Then, the second touch is performed while the first touch is continued, thereby the objects are rearranged on the circumference about the first touch position as an approximate center. Further, the objects are displayed on the opposite side to the second touch position regarding the first touch position, and the up-and-down direction of the objects are determined based on a vector defined with the first touch position and the second touch position.

With this arrangement, it is possible to provide an intuitive operational environment with excellent operability for the operator to understand the contents of objects instantly from any direction.

Further, in the object arrangement control processing, the objects are rearranged circularly about the first touch position as an approximate center, however, the present invention is not limited to this arrangement. The objects may be arranged linearly on the opposite side to the second touch position regarding the first touch position.

Further, the present invention can be implemented as a system, an apparatus, a method, a program or a recording medium (storage medium) or the like. Specifically, the present invention is applicable to a system having plural devices (e.g., a host computer, an interface device, an imaging device, a web application program and the like), or to an apparatus having a single device.

As described above, according to the present embodiment, even when plural operators surrounding a display provided on a desk or table top plate conduct collaborative work, objects can be displayed in the optimum status for each operator. Further, as such display can be intuitively realized merely by an operation with the operator's index finger and thumb, a stress-free operational environment can be provided.

Note that in the above-described embodiments, the operator touches the screen with his/her index finger then his/her thumb, however, the order of the finger touch is not limited to this order. That is, this operational environment can be provided as long as the direction in which the operator exists, i.e., the up-and-down direction of the object such as a menu icon, is specified by the first touch then the following second touch and the object is displayed upright to the operator. Further, in the above-described embodiments, the system where plural persons are seated around a desk or the like has been described, however, the present invention may be applied to a display device such as a personal digital assistance.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-187644, filed Aug. 24, 2010, which is hereby incorporated by reference herein in its entirety.

What is claimed is:

1. An information processing apparatus that displays a menu on a display screen of a display device which is operable by a plurality of operators, and that performs processing in accordance with a menu item, selected by an operator, in the menu displayed on the display screen, the apparatus comprising:

a detecting unit that can detect plural touch positions on the display screen;

a display control unit that, when said detecting unit detects a first touch, displays a plurality of selectable menu items in a predetermined position, with respect to the first touch position, and in a predetermined direction;

a determination unit that, when said detecting unit detects a second touch that is an additional touch which is independent with respect to the first touch while continuously detecting the first touch, determines a direction defined by the first touch position and the second touch position as a display direction of the plurality of selectable menu items;

a rotation control unit that rotates, in response to the detection of the second touch, the plurality of selectable menu items, so as to make the upward direction of the plurality of selectable menu items correspond to the display direction determined by said determination unit, wherein, when one of the plurality of selectable menu items that are displayed by said display control unit or are rotated by said rotation control unit is selected, processing in accordance with the selected menu item is performed.

2. The information processing apparatus according to claim 1, wherein said display control unit arranges and displays the plurality of selectable menu items in a circle having a predetermined radius, with the first touch position being a center of the circle, where the plurality of selectable menu items are displayed (a) at equal intervals on a circumference of the circle and (b) in a upright direction viewed from the center, and wherein the apparatus further comprises a rearranging unit that rearranges and displays the plurality of selectable menu items on the circumference of the circle at intervals that (i) are narrower than the intervals between the respective menu items upon display by the display control unit and (ii) avoid overlap of the menu items, so as to bring a central position of the plurality of selectable menu items into correspondence with one of two intersections between the line connecting the first touch position and the second touch position and the circumference far from the second touch position.

3. The information processing apparatus according to claim 2, further comprising:

an update unit that, after said rearranging unit has rearranged the plurality of selectable menu items, and when at least one of the first touch position and the second touch position is moved while the first touch and the second touch are continued, updates the display direction and the arrangement of the plurality of selectable menu items in accordance with the moved first or second touch position, wherein said update unit includes a unit that changes the radius of the circle and a size of the plurality of selectable menu items in correspondence with a distance between the first touch position and the second touch position.

4. The information processing apparatus according to claim 1, wherein the apparatus further comprises a rearranging unit that rearranges and displays the plurality of selectable menu items, in response to the detection of the second touch, at intervals that are narrower than the intervals between the respective menu items upon display by the display control unit in the predetermined position with respect to the first touch position.

5. A control method for an information processing apparatus that comprises (a) a display device and (b) a detection unit, where the display device is operable by a plurality of operators and where the detection unit can detect plural touch positions on a display screen of the display device, wherein the apparatus performs processing in accordance with an object selected by the operator, the method comprising:
   a display control step of, when a first touch is detected by the detection unit, arranging and displaying a plurality of selectable menu items in a predetermined position, with respect to the first touch position, and in a predetermined direction;
   a determination step of, when a second touch that is an additional touch which is independent with respect to the first touch is detected while continuously detecting the first touch, determining a direction defined by the first touch position and the second touch position as a display direction of the plurality of selectable menu items; and
   a rotation control step of rotating, in response to the detection of the second touch, the plurality of selectable menu items, so as to make the upward direction of the plurality of selectable menu items correspond to the display direction determined in said determination step,
   wherein, when one of the plurality of selectable menu items that are displayed at said display control step or are rotated at said rotation control step is selected, processing in accordance with the selected menu item is performed.

6. The control method according to claim 5, wherein said display control step arranges and displays the plurality of selectable menu items in a circle having a predetermined radius, with the first touch position as a center of the circle, the plurality of selectable menu items being displayed (a) at equal intervals on a circumference of the circle and (b) in a upright direction viewed from the center, and
   wherein the method further comprises a rearranging step of rearranging and displaying the plurality of selectable menu items on the circumference at intervals that (i) are narrower than the intervals between the respective menu items upon display by said display control step and (ii) avoid overlap of the menu items, so as to bring a central position of the plurality of selectable menu items into correspondence with one of two intersections between the line connecting the first touch position and the second touch position and the circumference far from the second touch position.

7. The control method according to claim 6, further comprising:
   an update step of updating, after said rearranging step has rearranged the plurality of selectable menu items, and when at least one of the first touch position and the second touch position is moved while the first touch and the second touch are continued, the display direction and arrangement of the plurality of selectable menu items in accordance with the moved first or second touch position,
   wherein said update step includes a step of changing the radius of the circle and a size of the plurality of selectable menu items in correspondence with a distance between the first touch position and the second touch position.

8. The control method according to claim 5, further comprising a rearranging step of rearranging and displaying the plurality of selectable menu items, in response to the detection of the second touch, at intervals that are narrower than the intervals between the respective menu items upon display by said display control step in the predetermined position with respect to the first touch position.

9. A non-transitory computer-readable storage medium, holding a computer program read and executed by a computer comprising a display unit and a detecting unit that detects plural touch positions on the display screen of the display unit, the computer program effecting a method comprising:
   a display control step of, when the detecting unit detects a first touch, arranging and displaying a plurality of selectable menu items in a predetermined position, with respect to the first touch position, and in a predetermined direction;
   a determination step of, when the detecting unit detects a second touch that is an additional touch which is independent with respect to the first touch while continuously detecting the first touch, determining a direction defined by the first touch position and the second touch position as a display direction of the plurality of selectable menu items; and
   a rotation control step of rotating, in response to the detection of the second touch, the plurality of selectable menu items, so as to make the upward direction of the plurality of selectable menu items correspond to the display direction determined in said determination step,
   wherein, when one of the plurality of selectable menu items that are displayed at said display control step or are rotated at said rotation control step is selected, processing in accordance with the selected menu item is performed.

10. The storage medium according to claim 9, wherein said display control step arranges and displays the plurality of selectable menu items in a circle having a predetermined radius, with the first touch position as a center of the circle, the plurality of selectable menu items being displayed (a) at equal intervals on a circumference of the circle and (b) in a upright direction viewed the center, and
   wherein the method further comprises a rearranging step of rearranging and displaying the plurality of selectable menu items on the circumference at intervals that (i) are narrower than the intervals between the respective objects upon display by said display control step and (ii) avoid overlap of the menu items, so as to bring a central position of the plurality of selectable menu items into correspondence with one of two intersections between the line connecting the first touch position and the second touch position and the circumference far from the second touch position.

11. The storage medium according to claim 10, wherein the method further comprises an update step of updating, after said rearranging step has rearranged the plurality of selectable menu items, and when at least one of the first touch position and the second touch position is moved while the first touch and the second touch are continued, the display direction and arrangement of the plurality of selectable menu items in accordance with the moved first or second touch position, and wherein said update step includes a step of changing the radius of the circle and a size of the plurality of selectable menu items in correspondence with a distance between the first touch position and the second touch position.

12. The storage medium according to claim 9, wherein the method further comprises a rearranging step of rearranging and displaying the plurality of selectable menu items, in response to the detection of the second touch, at intervals that are narrower than the intervals between the respective menu items upon display by said display control step in the predetermined position with respect to the first touch position.

* * * * *